(12) United States Patent
Ziegler et al.

(10) Patent No.: US 11,094,962 B2
(45) Date of Patent: Aug. 17, 2021

(54) METHOD FOR CONTROLLING A REGENERATION PROCESS OF A LITHIUM-ION BATTERY CELL THAT COMPRISES AN ANODE, A CATHODE AND A REGENERATION ELECTRODE

(71) Applicant: Robert Bosch GmbH, Stuttgart (DE)

(72) Inventors: Joerg Ziegler, Rutesheim (DE); Olivier Cois, Kernen (DE); Thomas Dufaux, Stuttgart (DE); Ulrich Lange, Aichtal (DE); Ulrich Hasenkox, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/738,721

(22) PCT Filed: May 25, 2016

(86) PCT No.: PCT/EP2016/061737
§ 371 (c)(1),
(2) Date: Dec. 21, 2017

(87) PCT Pub. No.: WO2016/206902
PCT Pub. Date: Dec. 29, 2016

(65) Prior Publication Data
US 2018/0175444 A1 Jun. 21, 2018

(30) Foreign Application Priority Data
Jun. 26, 2015 (DE) .............. 10 2015 211 935.1

(51) Int. Cl.
*H01M 10/00* (2006.01)
*H01M 10/0525* (2010.01)
(Continued)

(52) U.S. Cl.
CPC ..... *H01M 10/0525* (2013.01); *H01M 6/5005* (2013.01); *H01M 10/425* (2013.01);
(Continued)

(58) Field of Classification Search
CPC ......... H01M 10/0525; H01M 10/4242; H01M 6/5005; H01M 10/44; H01M 10/425; H01M 10/48
See application file for complete search history.

(56) References Cited

U.S. PATENT DOCUMENTS 6,335,115 B1 * 1/2002 Meissner ............... H01M 4/13
429/117
2006/0057433 A1 * 3/2006 Ando .................... H01G 9/155
429/9
(Continued)

FOREIGN PATENT DOCUMENTS

CN 101542818 A 9/2009
CN 102468521 A 5/2012
(Continued)

OTHER PUBLICATIONS

International Search Report for Application No. PCT/EP2016/061737 dated Sep. 30, 2016 (English Translation, 2 pages).

*Primary Examiner* — Nicholas P D'Aniello
(74) *Attorney, Agent, or Firm* — Michael Best & Friedrich LLP

(57) ABSTRACT

The present invention relates to a method for controlling a regeneration procedure of a lithium battery cell (1) which comprises an anode (2), a cathode (3) and the regeneration electrode (4). The method comprises: detecting a current availability of cyclable lithium in the anode (2); detecting a current availability of cyclable lithium in the cathode (3); passing a first current ($I_1$) between the anode (2) and the regeneration electrode (4) until the actual availability of cyclable lithium in the anode (2) corresponds to a targeted (Continued)

availability of cyclable lithium in the anode (2); and passing a second current (I2) between the cathode (3) and the regeneration electrode (4) until the current availability of cyclable lithium in the cathode (3) corresponds to a targeted availability of cyclable lithium in the cathode (3).

13 Claims, 3 Drawing Sheets

(51) Int. Cl.
| | | |
|---|---|---|
| *H01M 10/42* | (2006.01) | |
| *H01M 10/44* | (2006.01) | |
| *H01M 6/50* | (2006.01) | |
| *H01M 10/48* | (2006.01) | |

(52) U.S. Cl.
CPC ....... *H01M 10/4242* (2013.01); *H01M 10/44* (2013.01); *H01M 10/48* (2013.01)

(56) References Cited

U.S. PATENT DOCUMENTS

| | | | |
|---|---|---|---|
| 2006/0093871 A1* | 5/2006 | Howard | H01M 4/131 |
| | | | 429/9 |
| 2008/0003490 A1 | 1/2008 | Christensen et al. | |
| 2013/0029207 A1 | 1/2013 | Jain | |
| 2015/0263379 A1* | 9/2015 | Xiao | C25D 7/0614 |
| | | | 429/161 |

FOREIGN PATENT DOCUMENTS

| | | |
|---|---|---|
| CN | 103460493 A | 12/2013 |
| CN | 102468521 B | 4/2015 |
| WO | 2008002626 | 1/2008 |

\* cited by examiner

METHOD FOR CONTROLLING A REGENERATION PROCESS OF A LITHIUM-ION BATTERY CELL THAT COMPRISES AN ANODE, A CATHODE AND A REGENERATION ELECTRODE

BACKGROUND OF THE INVENTION

The present invention relates to a method for controlling a regeneration process of a lithium-ion battery cell that comprises an anode, a cathode and a regeneration electrode.

In order to implement electromobility, there is a need for rechargeable batteries that have a high specific energy density and a long cyclic and calendar lifespan. Lithium-ion batteries, having lithium-ion battery cells contained therein, are particularly suitable for this. Typically, about 10 years is required as a calendar lifespan. In addition, typically, a lifespan of over 1000 discharge cycles is required. Thereafter, the available capacity of the battery should be at least 80% of the initial capacity. A known ageing mechanism in the case of lithium-ion battery cells is the loss of cyclable lithium, resulting from unwanted side reactions in the lithium-ion battery cell. This results in a decrease in the capacity of the lithium-ion battery cell. A loss of cyclable lithium may be caused, for example, by a growth of an SEI (solid electrolyte interface) layer on an anode of the lithium-ion battery cells as the battery undergoes ageing. Since, as a result, lithium becomes chemically bound in the SEI layer, it is no longer available in the chemical cycle of the lithium-ion battery cell, and the cathode material can no longer be fully lithiated.

In order to counteract this effect, modern lithium-ion battery cells are equipped with a regeneration electrode, by which a loss of cyclable lithium can be compensated. Such a battery cell is known, for example, from WO2008/002626.

SUMMARY OF THE INVENTION

The method according to the invention for controlling a regeneration operation of a lithium-ion battery cell that comprises an anode, a cathode and a regeneration electrode comprises sensing a current availability of cyclable lithium in the anode, sensing a current availability of cyclable lithium in the cathode, passing a first current between the anode and the regeneration electrode until the current availability of cyclable lithium in the anode corresponds to a target availability of cyclable lithium in the anode, and passing a second current between the cathode and the regeneration electrode until the current availability of cyclable lithium in the cathode corresponds to a target availability of cyclable lithium in the cathode.

The separate sensing of the current availability of cyclable lithium in the anode and in the cathode achieves the effect that, following execution of the method, both the anode and the cathode have an optimum content of cyclable lithium, which is also mutually matched. A long-lasting high capacity of the lithium-ion battery cell is thus ensured. Cyclable lithium is lithium present in such a form that is suitable for contributing to the chemical reactions that enable the lithium-ion battery cell to be charged and discharged. In particular, the target availability of cyclable lithium is an original availability of lithium that exists at the start of the life of the lithium-ion battery cell.

It is advantageous if the method additionally comprises determining a deficit of cyclable lithium in the anode, wherein it is identified that the current availability of cyclable lithium in the anode corresponds to the target availability of cyclable lithium in the anode if the passing of the first current is effected until the determined deficit has been supplied to the anode, and/or determining a deficit of cyclable lithium in the cathode, wherein it is identified that the current availability of cyclable lithium in the cathode corresponds to the target availability of cyclable lithium in the cathode if the passing of the second current is effected until the determined deficit has been supplied to the cathode. Since the deficit is determined in advance, and therefore the corresponding deficit of lithium respectively determined in advance is supplied to the anode and/or to the cathode, a particularly precise replenishment of cyclable lithium in the anode and/or cathode is achieved, and thus a particularly high capacity of the lithium-ion battery cell is ensured. A particularly accurate estimation of the current availability of cyclable lithium in the anode and in the cathode is made possible because, owing to the fact that the deficit is determined in advance, there are no real-time requirements.

It is also advantageous if the current availability of cyclable lithium in the anode and/or the current availability of cyclable lithium in the cathode is/are determined on the basis of a state of health or an ageing state of the lithium-ion battery cell. This enables the current availability of cyclable lithium to be estimated particularly easily, since there is a correlation between a state of health, or ageing state, of a lithium-ion battery cell and its cyclable lithium content.

It is additionally advantageous if the current availability of cyclable lithium in the anode is determined on the basis of a change in a characteristic curve of an anode potential, and/or the current availability of cyclable lithium in the cathode is determined on the basis of a change in a characteristic curve of a cathode potential. In particular, the change in this case is a shift, a scaling or an end point of the respective characteristic curve. In this way, the current availability of cyclable lithium is determined in a particularly accurate manner. The characteristic curve of the anode potential in this case is a potential profile at the anode, over a charge state of the lithium-ion battery cell. The same applies, correspondingly, to the characteristic curve of the cathode potential.

A battery control system, which is designed to execute the method according to the invention, has all the advantages of the method according to the invention. In particular, it is advantageous if the battery control system has electronics that are designed to regulate the first and the second current by means of commutating transistors. A stable current source can thus be generated, and consequently filling of cyclable lithium can be effected in a uniform, and therefore precisely controllable, manner.

Additionally advantageous is a battery that comprises a battery control system according to the invention. This has all the advantages of the battery control system.

It is advantageous if the regeneration electrode is disposed in the lithium-ion battery cell in such a manner that its potential is between a potential of the anode and a potential of the cathode. This avoids the need for the build-up of a high potential, with respect to the anode and the cathode, in order to enrich both the anode and the cathode with cyclable lithium.

BRIEF DESCRIPTION OF THE DRAWINGS

Exemplary embodiments of the invention are described in detail in the following with reference to the accompanying drawings. In the drawings.

DETAILED DESCRIPTION

Figure 1:
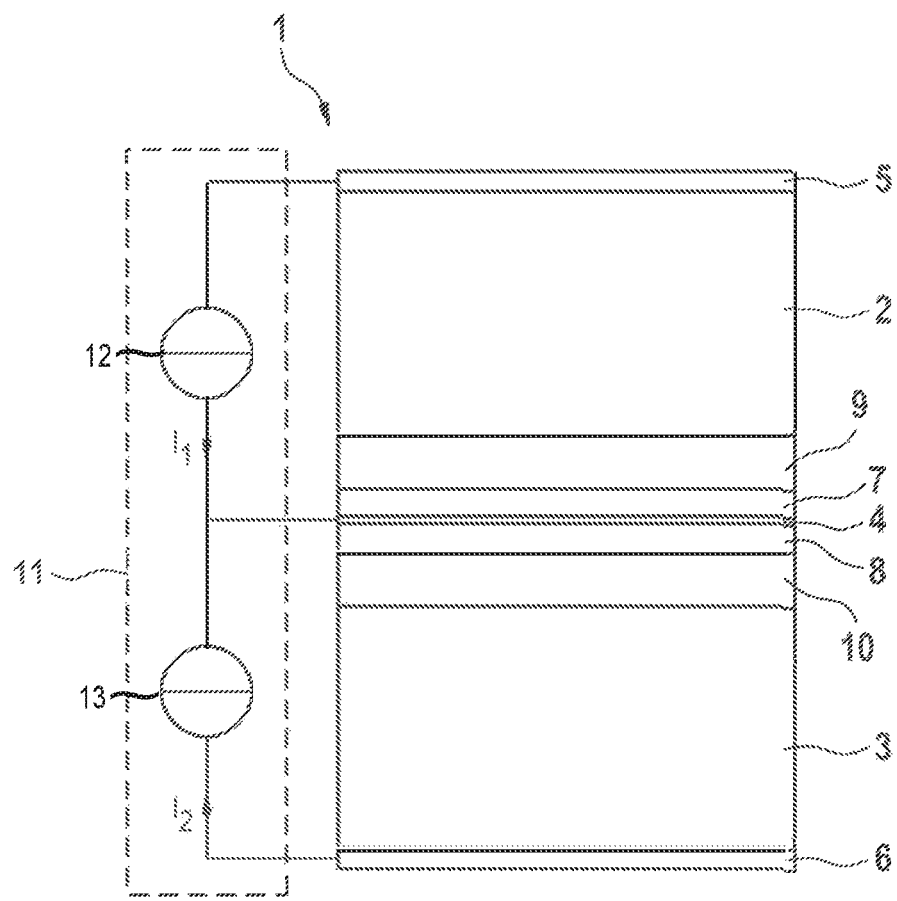
FIG. 1 is a representation of a lithium-ion battery cell to which the method according to the invention is applied.

FIG. 1 shows an exemplary lithium-ion battery cell 1, to which the method according to the invention is applied. The lithium-ion battery cell 1 comprises an anode 2, a cathode 3 and a regeneration electrode 4.

The anode 2 is a layer that is composed, for example, of graphite, carbon, silicon, or also of composites of these materials, in combination with a polymer binder. During charging of the battery, lithium ions, which are drawn from the cathode 3, are stored in the anode 2. During discharging of the lithium-ion battery cell 1, these lithium ions are taken back out of the anode 2.

The cathode 3 is preferably composed of a lithium transition-metal oxide, e.g. $LiNi_xMn_yCo_zO_2$, or an over-lithiated lithium transition-metal oxide, e.g. $LiNi_xMn_yCo_zO_2*Li_2MnO_3$, or another suitable lithium compound that contains lithium ions, other metal ions and oxygen, or a lithium transition-metal phosphate, e.g. $LiFePO_4$, and also of carbon and an polymer binder. During charging of the lithium-ion battery cell 1, lithium ions are drawn from the cathode 3, from the crystal lattice, and stored in the anode 2. During discharging of the lithium-ion battery cell 1, the lithium ions are incorporated back into the crystal lattice of the cathode 3.

The regeneration electrode 4 serves as a lithium source. It is preferably composed of metallic lithium, possibly other additives of carbon, polymers, ceramics or metals, and a current collector. The regeneration electrode 4 may also be referred to as a lithium electrode. Alternatively, other lithium-containing compounds, that can give off lithium ions electrochemically, may be used as a lithium source in the regeneration electrode 4. These compounds are less suitable, however, because they have a lesser energy density relative to their mass and the volume.

The lithium-ion battery cell 1 has a layered structure. The differing layers of the lithium-ion battery cell 1 lie on each other in the following sequence: the uppermost layer is formed by an anode collector 5 that serves as a current collector for the anode 2. There then follows the anode 2, followed by a first separator 9, followed by a first protective layer 7. Lying beneath the first protective layer 7 is the regeneration electrode 4, followed by a second protective layer 8, which is followed, in turn, by a second separator 10. Disposed as the next layer is the cathode 3, which is followed, in turn, by a cathode collector 6, as a finishing layer. It is to be pointed out that the first protective layer 7 and the second protective layer 8 are to be regarded as optional protective layers.

The anode collector 5 and the cathode collector 6 are each a metallic, electrically conductive layer that is connected, in each case via a lead, to a battery control system 11. The regeneration electrode 4 is likewise connected to the battery control system 11 via a lead. The battery control system 11 is designed to allow a first current $I_1$ to flow between the regeneration electrode 4 and the anode collector 5. For this purpose, the battery control system 11 comprises a first current source 12, which is connected between the anode collector 5 and the regeneration electrode 4. In addition, the battery control system 11 is designed to allow a second current $I_2$ to flow from the regeneration electrode 4 to the cathode collector 6. For this purpose, the battery control system 11 comprises a second current source 13, which is connected between the regeneration electrode 4 and the cathode collector 6.

The method according to the invention, in a first embodiment, is described in the following.

If the method according to the invention is executed in this first embodiment, then, firstly, a current availability of cyclable lithium in the anode 2 is sensed, and at the same time a deficit of cyclable lithium in the anode 2 is determined. This is effected on the basis of a shift of a characteristic curve of an anode potential. For this purpose, a current characteristic curve of the anode potential $U_{AN\text{-}act}$ is determined, at least portionally, and this is compared with an original characteristic curve of the anode potential $U_{AN\text{-}prev}$. The current characteristic curve of the anode potential $U_{AN\text{-}act}$ in this case is a characteristic curve of the anode potential at a current time point at which the method is executed, and the original characteristic curve of the anode potential $U_{AN\text{-}prev}$ is a characteristic curve that was determined at a time point of manufacture of the lithium-ion battery cell 1.

Figure 2:
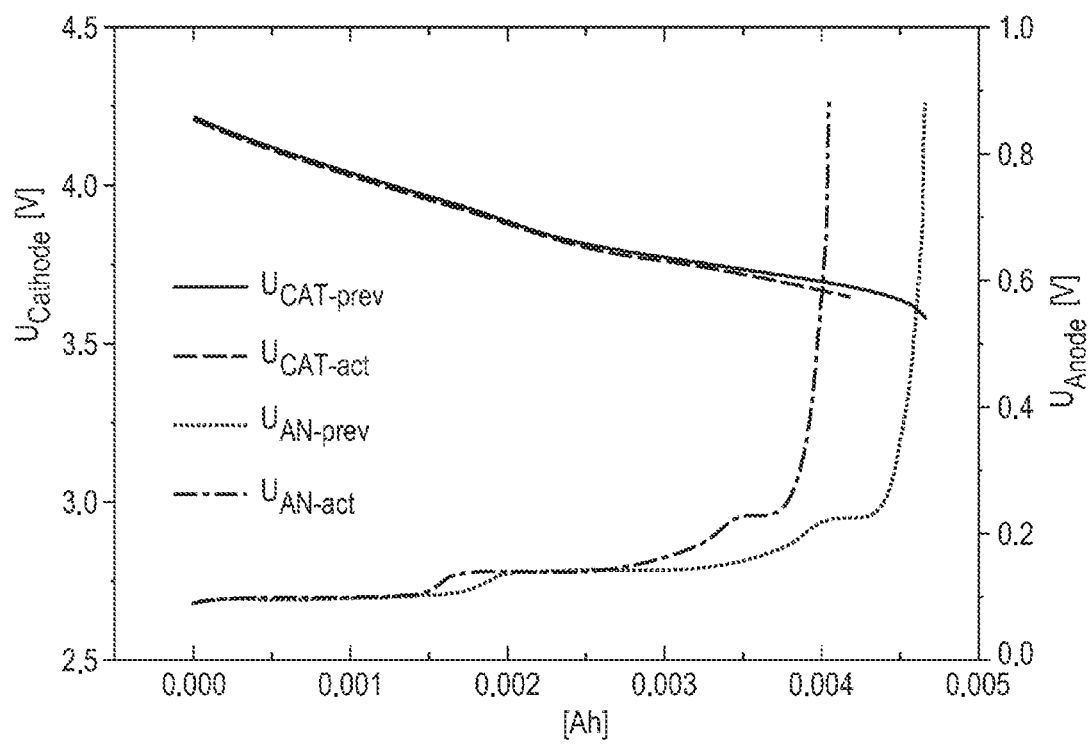
FIG. 2 is a representation of characteristic curves of an anode potential and characteristic curves of a cathode potential, at differing ageing states of the lithium-ion battery cell.

Such characteristic curves are represented exemplarily in FIG. 2. The original characteristic curve of the anode potential $U_{AN\text{-}prev}$ is represented by a dotted line. It can be seen that this characteristic curve represents a potential that at first increases steadily with a discharging of the lithium-ion battery cell 1 and that rises steeply from a certain time point. The current characteristic curve of the anode potential $U_{AN\text{-}act}$ is represented by a dash-dot line, and corresponds in its basic profile to the original characteristic curve of the anode potential $U_{AN\text{-}prev}$, although it rises steeply at an even earlier discharge state of the lithium-ion battery cell 1.

A distance between mutually corresponding points of the original characteristic curve of the anode potential $U_{UN\text{-}prev}$ and the current characteristic curve of the anode potential $U_{AN\text{-}act}$ is an indicator of the current availability of cyclable lithium in the anode 2 and, at the same time, of a deficit of cyclable lithium in the anode 2, since the availability is described here as a function of an original availability. In this case, the greater the distance, i.e. the more the current characteristic curve of the anode potential $U_{AN\text{-}act}$ is shifted and scaled relative to the original characteristic curve of the anode potential $U_{AN\text{-}prev}$, the less the current availability of cyclable lithium in the anode 2.

The distance may be determined, for example, in that, firstly, mutually associated points are determined on the characteristic curve of the anode potential $U_{AN\text{-}prev}$ and the current characteristic curve of the anode potential $U_{AN\text{-}act}$. Thus, for example, significant points of inflexion or maximum curvatures of the characteristic curves can be determined by means of the maxima in first and second derivatives thereof, and assigned to each other. For example, a distance between the charge states of the lithium-ion battery cell, at which the respective characteristic curve rises sharply in each case, can thus be determined and serve as an indicator of the current availability of cyclable lithium in the anode 2.

In the further course of the method, a current availability of cyclable lithium in the cathode 3 is sensed, and at the same time a deficit of cyclable lithium in the cathode 3 is determined. This is effected on the basis of a shift of a characteristic curve of a cathode potential. For this purpose, a current characteristic curve of the cathode potential $U_{CAT\text{-}act}$ is determined, at least portionally, and this is compared with an original characteristic curve of the cathode potential $U_{CAT-prev}$. The current characteristic curve of the cathode potential $U_{CAT-act}$ in this case is a characteristic curve of the cathode potential at the current time point at which the method is executed, and the original characteristic curve of the cathode potential $U_{CAT-prev}$ is a characteristic curve that was determined at the time point of manufacture of the lithium-ion battery cell 1.

Such characteristic curves are represented exemplarily in FIG. 2. The original characteristic curve of the cathode potential $U_{CAT-prev}$ is represented by an unbroken line. It can be seen that this characteristic curve represents a potential that decreases steadily with a discharging of the lithium-ion battery cell 1. The current characteristic curve of the cathode potential $U_{CAT-act}$ is represented by a dashed line, and corresponds in its basic profile to the original characteristic curve of the cathode potential $U_{CAT-prev}$, but the characteristic curve ends at a more positive potential because the cathode, owing to the loss of cyclable lithium, can no longer be fully lithiated. A difference between the original characteristic curve of the cathode potential $U_{CAT-prev}$ and the current characteristic curve of the cathode potential $U_{CAT-act}$ thus consists in that the characteristic curve of the cathode potential $U_{CAT-act}$ is shortened, i.e. the original cathode potential is no longer achieved when the lithium-ion battery cell 1 is in a discharged state.

A distance between an end point of the original characteristic curve of the cathode potential $U_{CAT-prev}$ and an end point of the current characteristic curve of the cathode potential $U_{CAT-act}$ is an indicator of the current availability of cyclable lithium in the cathode 3 and, at the same time, of a deficit of cyclable lithium in the cathode 3, since the availability is described here as a function of an original availability. The end point of the respective characteristic curve of the cathode potential is described by a cathode potential when the lithium-ion battery cell 1 is in the discharged state. In this case, the greater the distance between the end points, the less the current availability of cyclable lithium in the cathode 3. The distance in this case may be described as a potential difference between the end points of the characteristic curves of the cathode potential $U_{CAT-act}$ and $U_{CAT-prev}$. The cathode potential when the lithium-ion battery cell 1 is in the discharged state is therefore a measure of the loss of cyclable lithium. Preferably, therefore, lithium is intercalated into the cathode 3 from the regeneration electrode 4 until the cathode potential in the discharged state corresponds to a cathode potential of the new cell.

In this embodiment, the distance is determined in that the lithium-ion battery cell 1 is discharged and then the cathode potential of the cathode 3 is determined. This is compared with a previously stored cathode potential of the cathode 3 that the lithium-ion battery cell 1 exhibited, in a discharged state, at the time point of its production. The thus determined distance serves as an indicator of the current availability of cyclable lithium in the cathode 3.

In a following step of the method according to the invention, in this first embodiment, a first current $I_1$ is passed between the anode 2 and the regeneration electrode 4 until the current availability of cyclable lithium in the anode 2 corresponds to a target availability of cyclable lithium in the anode 2. This is effected in that the deficit determined for the anode 2 is added to a currently available quantity of cyclable lithium in the anode 2. The target availability of cyclable lithium in the anode 2 is therefore equal to the original availability of cyclable lithium in the anode 2.

For this purpose, the current availability of cyclable lithium in the anode 2, which at the same time describes the deficit of cyclable lithium, is converted into a first time period and an associated first current $I_1$ that is used, in the further course of the method, for regeneration of the anode 2. For this purpose it is sufficient if, once, in advance of the method, for example, during production of the lithium-ion battery cell 1, a ratio is determined, between the determined deficit and a charge quantity that is sufficient to regenerate the anode 2 in such a manner that the determined deficit tends to 0 in the case of a newly measured current characteristic curve of the anode potential $U_{AN-act}$, i.e. the current characteristic curve of the anode potential $U_{AN-act}$ is superposed on the original characteristic curve of the anode potential $U_{AN-prev}$. Thus, a respective charge value, here as a first current $I_1$ and an associated first time period, could be stored for differing characteristic curves of the anode potential $U_{AN-act}$. It is not necessary in this case for the deficit to be available as a specification of quantity.

The first current $I_1$, derived from the determined deficit, is conducted, for the first time period, derived from the deficit, via the regeneration electrode 4 and the anode 2. For this purpose, the battery control system 11 that executes the method according to the invention has the first current source 12, which regulates a supply voltage, by means of commutating transistors, in such a manner that the first current $I_1$ flows through the anode 2. This is effected for the determined first time period. It is thus identified that the current availability of cyclable lithium in the anode 2 corresponds to the target availability of cyclable lithium in the anode 2 if the passing of the first current $I_1$ is effected until the determined deficit has been supplied to the anode 2.

In a following step of the method according to the invention, in this first embodiment, a second current $I_2$ is passed between the cathode 3 and the regeneration electrode 4 until the current availability of cyclable lithium in the cathode 3 corresponds to a target availability of cyclable lithium in the cathode 3. This is effected in that the deficit determined for the cathode 3 is added to a currently available quantity of cyclable lithium in the cathode 3. The target availability of cyclable lithium in the cathode 3 is therefore equal to the original availability of cyclable lithium in the cathode 3.

For this purpose, the current availability of cyclable lithium in the cathode 3, which at the same time describes the deficit of cyclable lithium, is converted into a second time period and an associated second current $I_2$ that is used, in the further course of the method, for regeneration of the cathode 3. For this purpose it is sufficient if, once, in advance of the method, for example, during production of the lithium-ion battery cell 1, a ratio is determined, between the determined deficit and a charge quantity that is sufficient to regenerate the cathode 3 in such a manner that the determined deficit tends to 0 in the case of a newly measured current characteristic curve of the cathode potential $U_{CAT-act}$, i.e. the current characteristic curve of the cathode potential $U_{CAT-act}$ is superposed on the original characteristic curve of the cathode potential $U_{CAT-prev}$. Thus, a respective charge value, here as a second current $I_2$ and an associated second time period, could be stored for differing characteristic curves of the cathode potential $U_{CAT-act}$. It is not necessary in this case for the deficit to be available as a specification of quantity.

The second current $I_2$, derived from the determined deficit, is conducted, for the second time period, derived from the deficit, via the regeneration electrode 4 and the cathode 3. For this purpose, the battery control system 11 that executes the method according to the invention has the second current source 13, which regulates a supply voltage, by means of commutating transistors, in such a manner that the second current $I_2$ flows through the cathode 3. This is effected for the determined second time period. It is thus identified that the current availability of cyclable lithium in the cathode 3 corresponds to the target availability of cyclable lithium in the cathode 3 if the passing of the second current $I_2$ is effected until the determined deficit has been supplied to the cathode 3.

A first current $I_1$ is thus passed between the anode 2 and the regeneration electrode 4 until the current availability of cyclable lithium in the anode 2 corresponds to a target availability of cyclable lithium in the anode 2, and a second current $I_2$ is passed between the cathode 3 and the regeneration electrode 4 until the current availability of cyclable lithium in the cathode 3 corresponds to a target availability of cyclable lithium in the cathode 3. The respective target availability of cyclable lithium in this case is as close as possible to an original availability of cyclable lithium in the anode 2 and to an original availability of cyclable lithium in the cathode 3 that they exhibited at the time point of production of the lithium-ion battery cell 1.

Figure 3:
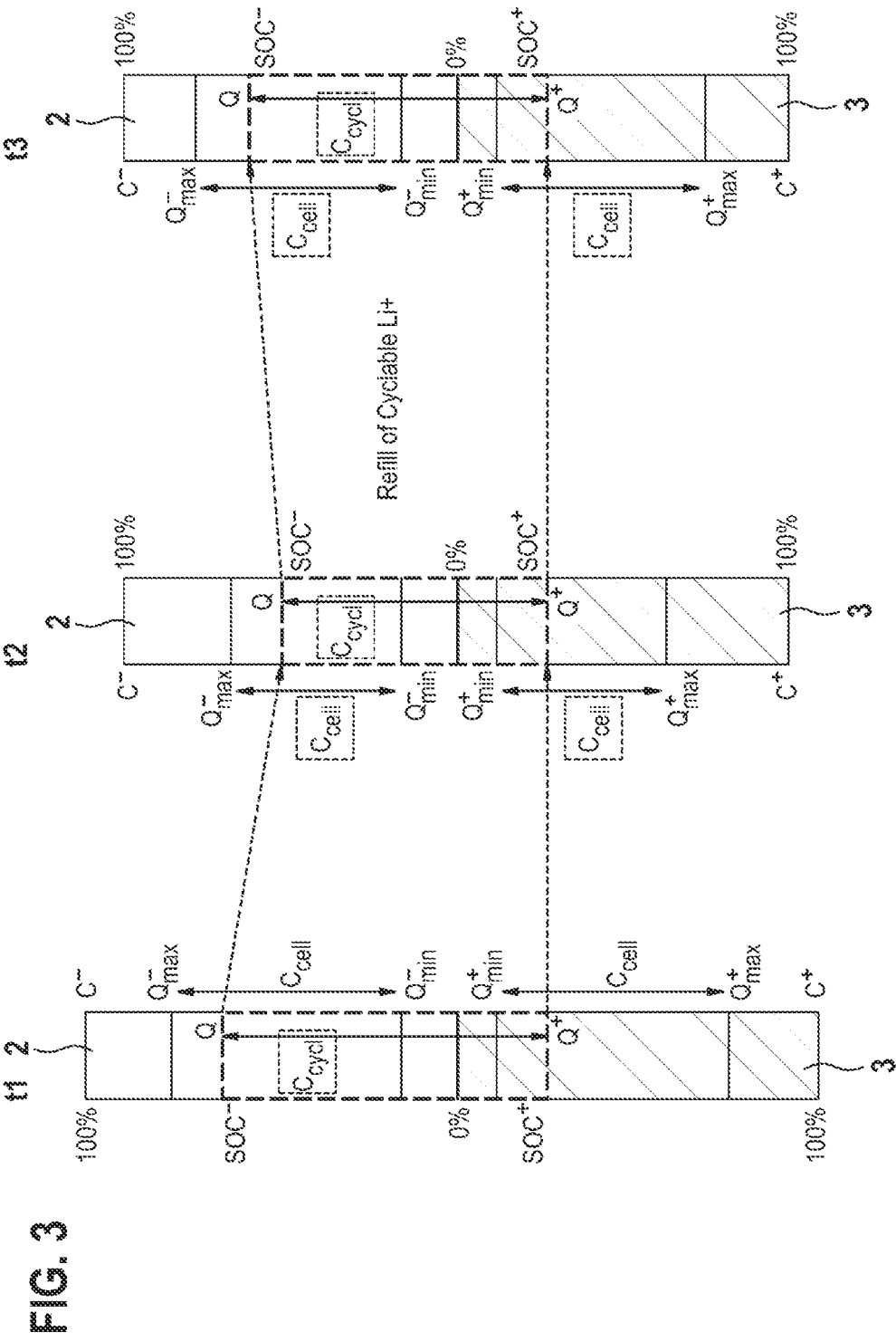
FIG. 3 is a schematic representation of a lithium-ion battery cell over its lifecycle, in the case of an exemplary application of the method according to the invention.

Reference is made to FIG. 3. Shown on the far left in FIG. 3 is a schematic representation of the lithium-ion battery cell 1 at the start of its life, at a first time point t1. The lithium-ion battery cell has maximum capacities $C^-$ and $C^+$, which describe a maximum possible capacity of the anode and cathode. However, the lithium-ion battery cell 1 is not charged up to its maximum capacities $C^-$ and $C^+$, in order to avoid damage to the lithium-ion battery cell 1. The lithium-ion battery cell 1 therefore additionally has a nominal capacity $C_{cell}$, at which the lithium-ion battery cell 1 possesses a maximum nominal charge $Q^-_{max}$ and $Q^+_{max}$, each of which is less than the maximum capacities $C^-$ and $C^+$ of the anode 2 and of the cathode 3. These maximum charges $Q^-_{max}$ and $Q^+_{max}$ describe the maximum charge content of the lithium-ion battery cell 1 when the latter is fully charged. Correspondingly, the lithium-ion battery cell 1 has minimum charges $Q^-_{min}$ and $Q^+_{min}$ when it is discharged. In fact, in the states shown in FIG. 3, the lithium-ion battery cell 1 is charged only to a certain extent. This is characterized on the anode side by the value $SOC^-$ and on the cathode side by the value $SOC^+$ (SOC—state of charge), which describe an actual anode-side charge content of the lithium-ion battery cell $Q^-$ and an actual cathode-side charge content of the lithium-ion battery cell $Q^+$. A difference between these charge states describes an actual capacity $C_{cycl}$ of the lithium-ion battery cell 1, i.e. a quantity of energy that can be drawn from the lithium-ion battery cell 1.

Shown in the middle representation of FIG. 3 is the lithium-ion battery cell 1 at a second time point t2, at which it has already aged relative to the first time point t1. It can be seen, on the one hand, that the maximum capacities $C^-$ and $C^+$ of the lithium-ion battery cell 1 are now less, which is due to differing ageing processes in the lithium-ion battery cell 1. At the second time point t2 the lithium-ion battery cell 1 has the same charge state as at the first time point t1. It can be seen, however, that the actual capacity $C_{cycl}$ is now less, and the maximum charge $Q^-_{max}$ and $Q^+_{max}$ has dropped. This is due to the fact that the quantity of cyclable lithium has decreased greatly in the anode 2 and at least slightly in the cathode 3.

Shown on the right side in FIG. 3 is the lithium-ion battery cell 1 at a third time point t3. It can be seen that the maximum capacities $C^-$ and $C^+$ at the third time point t3 are equal to the maximum capacities $C^-$ and $C^+$ at the second time point t2, since these ageing processes are not due to a loss of cyclable lithium. The previously described method according to the invention has been executed between the second time point t2 and the third time point t3. It can be seen that the quantity of cyclable lithium has risen significantly in the anode 2 and at least slightly in the cathode 3. At the third time point t3 the lithium-ion battery cell 1 is in the same state of charge as it was also at the first time point t1 and at the second time point t2. It can be seen that the actual capacity $C_{cycl}$ of the lithium-ion battery cell 1 has risen again.

It thus becomes possible for already lost battery cell capacities to be regenerated in a non-invasive manner. For better understanding of FIG. 3, it must be pointed out that, in lithium-ion battery cells, there is usually an excess of cyclable lithium on the anode side.

The values used in FIG. 3 may be represented mathematically in their relationships as follows:

$$C_{cycl} = Q^+ + Q^- = C^+ SOC^+ + C^- SOC^-$$

$$C_{cell} = Q^+_{max} - Q^+_{min} = Q^-_{max} - Q^-_{min}$$

The charge content $Q_{cell}$ of the lithium-ion battery cell 1 in this case is obtained as follows:

$$Q_{cell} = Q^+ - Q^+_{min} = Q^- - Q^-_{min}$$

An off-load voltage $OCV_{cell}$ of the lithium-ion battery cell 1 may thus be represented as the following function:

$$OCV_{cell} = OCP^+(SOC^+) - OCP^-(SOC^-) = OCP^+(Q^+/C^+) - OCP^-(Q^-/C^-)$$

In this case the function $OCP^-(SOC^-)$ describes the characteristic curve of the anode potential, and the function $OCP^+(SOC^+)$ describes the characteristic curve of the cathode potential.

In the case of a normal charging and discharging of the lithium-ion battery cell 1, there is no conductive connection between the regeneration electrode 4, the cathode 3 and the anode 2. In the case of charging of the lithium-ion battery cell 1 or in the case of discharging the lithium-ion battery cell 1, the voltage may optionally be measured in the absence of current between the regeneration electrode 4 and the anode 2 or the cathode 3, and a charging voltage or discharging voltage determined against the regeneration electrode 4 and controlled. The regeneration electrode 4 in this case functions as a reference electrode. It thus also becomes possible, inter alia, to determine the current characteristic curve of the anode potential $U_{AN\text{-}act}$ or the current characteristic curve of the cathode potential $U_{CAT\text{-}act}$.

If the characteristic curves of the anode potential and/or of the cathode potential deviate from those of a new lithium-ion battery cell 1, this is an indication that a loss of cyclable lithium has occurred. In order to compensate this loss, the method according to the invention may be performed at defined time points, the regeneration electrode 4 switched with respect to the cathode 3 or the anode 2 such that lithium from the lithium-containing metallic regeneration electrode 4 is intercalated into the material of the cathode 3 or into the material of the anode 2, with a current flowing, respectively, via the electrical connection between the regeneration electrode 4 and the anode 2 or between the regeneration electrode 4 and the cathode 3. A lithium loss in the material of the cathode 3, for example resulting from formation of an SEI (solid electrolyte interface) layer on the anode side, can therefore be compensated. If lithium from the lithium-containing metallic regeneration electrode 4 is intercalated into the anode 2, it can also be transported from there to the cathode 3 and used to restore the original cathode capacity.

The lithiation according to the invention by means of the regeneration electrode 4 is preferably effected until the potentials at the anode 2 or cathode 3 correspond to the potentials of the lithium-ion battery cell 1 at the time point of its production. The loss of cyclable lithium is thereby recompensated.

Alternatively, if the loss of cyclable lithium is known with precision, as a function of the number of cycles, or as a function of time, the lithium electrode can always be brought into circuit after a particular number of cycles or a particular period of time.

Besides the above disclosure, reference is made explicitly to the disclosure of FIGS. 1 to 3.

The invention claimed is:

1. A method for controlling a regeneration process of a lithium-ion battery cell (1) that comprises a regeneration electrode (4), an anode (2) positioned on a first side of the regeneration electrode (4), a first separator (9) positioned between the anode (2) and the regeneration electrode (4), a cathode (3) positioned on a second side of the regeneration electrode (4), the second side being opposite to the first side, a second separator (10) positioned between the cathode (3) and the regeneration electrode (4), the regeneration electrode (4) oriented parallel to the anode (2) and the cathode (3), the method comprising:
    sensing a current availability of cyclable lithium in the anode (2),
    sensing a current availability of cyclable lithium in the cathode (3),
    passing a first current ($I_1$) between the anode (2) and the regeneration electrode (4) until the current availability of cyclable lithium in the anode (2) corresponds to a target availability of cyclable lithium in the anode (2), and
    passing a second current ($I_2$) between the cathode (3) and the regeneration electrode (4) until the current availability of cyclable lithium in the cathode (3) corresponds to a target availability of cyclable lithium in the cathode (3)
wherein no additional anode is positioned on the second side of the regeneration electrode (4) and no additional cathode is positioned on the first side of the regeneration electrode (4)
    wherein the first current ($I_1$) is provided via a first current source (12) connected between the anode (2) and the regeneration electrode (4) and the second current ($I_2$) is provided via a second current source (13) connected between the cathode (6) and the regeneration electrode (4).

2. The method as claimed in claim 1, further comprising:
    determining a deficit of cyclable lithium in the anode (2), wherein it is identified that the current availability of cyclable lithium in the anode (2) corresponds to the target availability of cyclable lithium in the anode (2) if the passing of the first current ($I_1$) is effected until the determined deficit has been supplied to the anode (2).

3. The method as claimed in claim 1, wherein the current availability of cyclable lithium in the anode (2) is determined on the basis of a state of health or an ageing state of the lithium-ion battery cell (1).

4. The method as claimed in claim 1, wherein the current availability of cyclable lithium in the anode (2) is determined on the basis of a change in a characteristic curve of an anode potential.

5. A battery control system (11) configured to execute the method as claimed in claim 1.

6. The battery control system (11) as claimed in claim 5, comprising electronics configured to regulate the first and the second current ($I_1$, $I_2$) by means of commutating transistors.

7. A battery, comprising a battery control system (11) as claimed in claim 5, and also comprising the lithium-ion battery cell (1), wherein the regeneration electrode (4) is disposed in the lithium-ion battery cell (1) in such a manner that its potential is between a potential of the anode (2) and a potential of the cathode (3).

8. The method as claimed in claim 1, further comprising:
    determining a deficit of cyclable lithium in the cathode (3), wherein it is identified that the current availability of cyclable lithium in the cathode (3) corresponds to the target availability of cyclable lithium in the cathode (3) if the passing of the second current (I2) is effected until the determined deficit has been supplied to the cathode (3).

9. The method as claimed in claim 1, wherein the current availability of cyclable lithium in the cathode (3) is/are determined on the basis of a state of health or an ageing state of the lithium-ion battery cell (1).

10. The method as claimed in claim 1, wherein the current availability of cyclable lithium in the cathode (3) is determined on the basis of a change in a characteristic curve of a cathode potential.

11. The method as claimed in claim 1, further comprising the following steps:
    determining a deficit of cyclable lithium in the anode (2), wherein it is identified that the current availability of cyclable lithium in the anode (2) corresponds to the target availability of cyclable lithium in the anode (2) if the passing of the first current (I1) is effected until the determined deficit has been supplied to the anode (2), and
    determining a deficit of cyclable lithium in the cathode (3), wherein it is identified that the current availability of cyclable lithium in the cathode (3) corresponds to the target availability of cyclable lithium in the cathode (3) if the passing of the second current (I2) is effected until the determined deficit has been supplied to the cathode (3).

12. The method as claimed in claim 11, wherein the current availability of cyclable lithium in the anode (2) and/or the current availability of cyclable lithium in the cathode (3) is/are determined on the basis of a state of health or an ageing state of the lithium-ion battery cell (1).

13. The method as claimed in claim 11, wherein the current availability of cyclable lithium in the anode (2) is determined on the basis of a change in a characteristic curve of an anode potential, and/or the current availability of cyclable lithium in the cathode (3) is determined on the basis of a change in a characteristic curve of a cathode potential.

* * * * *